(12) United States Patent
Goodwin et al.

(10) Patent No.: US 10,740,809 B2
(45) Date of Patent: Aug. 11, 2020

(54) TRANSACTIONAL, DIGITAL IMAGE-BASED ASYNCHRONOUS ELECTRONIC COMMUNICATION

(71) Applicant: Staples, Inc., Framingham, MA (US)

(72) Inventors: Ian Goodwin, Boston, MA (US); Ryan Bartley, Sammamish, WA (US); M. Steven Walker, Andover, MA (US); Pratabkumar Vemana, Sammamish, WA (US); Faisal Masud, Fall City, WA (US)

(73) Assignee: Staples, Inc., Framingham, MA (US)

( * ) Notice: Subject to any disclaimer, the term of this patent is extended or adjusted under 35 U.S.C. 154(b) by 668 days.

(21) Appl. No.: 15/357,944

(22) Filed: Nov. 21, 2016

(65) Prior Publication Data

US 2017/0148072 A1    May 25, 2017

Related U.S. Application Data

(60) Provisional application No. 62/258,379, filed on Nov. 20, 2015.

(51) Int. Cl.
*G06Q 30/00* (2012.01)
*G06Q 30/06* (2012.01)
(Continued)

(52) U.S. Cl.
CPC ....... *G06Q 30/0613* (2013.01); *G06Q 20/102* (2013.01); *G06Q 20/12* (2013.01);
(Continued)

(58) Field of Classification Search
CPC .. G06Q 20/102; G06Q 30/0613; G06Q 20/12; G06Q 30/0643; G06Q 30/0633; H04L 51/08
(Continued)

(56) References Cited

U.S. PATENT DOCUMENTS

| 8,365,081 B1* | 1/2013 | Amacker | G06Q 10/10 705/27.1 |
| 2010/0162137 A1* | 6/2010 | Ganz | G06F 3/011 715/757 |

(Continued)

OTHER PUBLICATIONS

Marin Software: Cross-Device and Image-Based Shopping Ad Campaign Investment Crucial for Retailers During Q4 2015 Internet Wire Sep. 17, 2015; Dialog Accession #428901196; 3pgs. (Year: 2015).*

(Continued)

*Primary Examiner* — Robert M Pond
(74) *Attorney, Agent, or Firm* — Patent Law Works, LLP

(57) ABSTRACT

According to an example implementation, a method comprises generating a graphical asynchronous messaging user interface including an input region containing a set of digital images of items and an activity region displaying graphical messaging elements respectively representing messages sent between a consumer node and a provider node, displaying the graphical asynchronous messaging user interface, receiving a first user input from a user via the input region selecting a first digital image associated with a first item from the set of digital images of items in the input region, generating a first message including the first digital image associated with the first item, including the first message including the first digital image associated with the first item in a first messaging element in the activity region displayed to the user on the display device, and transmitting the first message via a public computer network as a request to the provider node.

20 Claims, 13 Drawing Sheets

(51) Int. Cl.
     *G06Q 20/12*     (2012.01)
     *G06Q 20/10*     (2012.01)
     *H04L 12/58*     (2006.01)

(52) U.S. Cl.
     CPC ..... *G06Q 30/0633* (2013.01); *G06Q 30/0643* (2013.01); *H04L 51/08* (2013.01)

(58) Field of Classification Search
     USPC .................................................... 705/26, 27
     See application file for complete search history.

(56) References Cited

U.S. PATENT DOCUMENTS

| | | | | |
|---|---|---|---|---|
| 2012/0047046 A1* | 2/2012 | Mengerink | ............ | G06Q 20/10 705/26.41 |
| 2014/0136346 A1* | 5/2014 | Teso | ............ | G06Q 30/06 705/14.72 |
| 2015/0347961 A1* | 12/2015 | Gillen | ............ | G06Q 30/0635 705/14.73 |
| 2016/0065513 A1* | 3/2016 | Lundy | ............ | H04L 51/10 715/719 |
| 2017/0118154 A1* | 4/2017 | Venkatakrishnan | .... | H04L 51/18 |

OTHER PUBLICATIONS

CON-TEXT-UAL Marketing Cowan, James. Canadian Business 88.13: 8-9. St. Joseph Communications. (Nov. 2015); Dialog ID #1724503328; 4pgs. (Year: 2015).*

\* cited by examiner

TRANSACTIONAL, DIGITAL IMAGE-BASED ASYNCHRONOUS ELECTRONIC COMMUNICATION

CROSS-REFERENCE TO RELATED APPLICATIONS

This application claims the benefit under 35 U.S.C. § 119(e) of U.S. Provisional Patent Application No. 62/258,379, entitled "Emoji and Message-based E-commerce" filed Nov. 20, 2015, which is incorporated herein by reference in its entirety.

BACKGROUND

The present specification generally relates to the field of transactional asynchronous electronic communication.

The use of the internet to promote and sell products has proliferated in recent years to the point where it has become a significant portion of retail sales. Commonly, users shop online using ecommerce portals, such as the website accessible at http://www.staples.com. Using these e-commerce portals, users can browse products by category, read reviews, add items to virtual shopping cart, and proceed through the checkout process where the user inputs payment and delivery information and consummates the transaction.

However, with the increasing popularity of mobile devices that have limited screen sizes, there is a need for online retailers to adapt their shopping applications to those devices. Otherwise, customers are left with a cumbersome shopping experience that requires users to interact with layouts, buttons, links, etc., of websites which are designed for larger size screens that are commonly found on desktops and laptops and not for considerably smaller screens. Additionally, inputting information on these sites requires a considerable amount of typing using a soft QWERTY keyboard that is often difficult to use, which results in the users typing more typos that usual and resorting to correcting those typos with less-than-optimal tools. These frustrating customer experiences usually result in lower conversion rates because of the amount of time and effort it takes to consummate the transaction.

Some e-commerce solutions use messaging, such as SMS messaging, to receive products manually typed using a letter-script (e.g., Latin script) keyboard by the user. These solutions then use Natural Language processing or personnel to converse with the end user to determine the exact product(s) the user wants to purchase. However, these solutions have not been widely adopted because they are too time consuming—it takes too much time to textually explain and clarify what the products they want so the correct products get ordered. In that amount of time, the user could have purchased the product(s) using a conventional cart-based web site flow.

Further, customers increasingly expect that online shopping applications will surface relevant results and provide a satisfying and efficient shopping experience. This also applies to post-sale flows like customer support and returns. Current solutions are often not customer-centric, but instead require customers to submit information via a web form and then wait days or weeks for assistance. While some sites provide a real-time chat experience, it is not seamlessly integrated with the customer's purchase experience nor is it effective at preserving prior correspondence between the customer and customer support. As a result, the customer typically has to repeat all of the details of the problem he/she is experience over again during a subsequent support session. This leaves the customer feeling uncared for and can ultimately lead to the loss of that customer.

Thus, there is a need for a new, efficient digital user experience that surfaces virtual products in a natural way and allows for an expedient and low-friction virtual product selection and checkout process, as well as a seamless post-purchase experience.

SUMMARY

According to one innovative aspect of the subject matter described in this disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for transacting orders using an asynchronous messaging interface, including: at a computer processor, generating a graphical asynchronous messaging user interface including an input region containing a set of digital images of items and an activity region displaying graphical messaging elements respectively representing messages sent between a consumer node and a provider node; at a display device coupled to the computer processor, displaying the graphical asynchronous messaging user interface; at an input device coupled to the computer processor, receiving a first user input from a user via the input region selecting a first digital image associated with a first item from the set of digital images of items in the input region; at the computer processor, generating a first message including the first digital image associated with the first item; at the computer processor, including the first message including the first digital image associated with the first item in a first messaging element in the activity region displayed to the user on the display device; and at a communication unit coupled to the computer processor and associated with the consumer node, transmitting the first message via a public computer network as a request to the provider node. Other implementations of this aspect include corresponding computer systems, apparatus, and computer programs recorded on one or more computer storage devices, each configured to perform the actions of the methods.

Implementations may include one or more of the following features. The method where the graphical asynchronous messaging user interface includes user selectable content regions for categories of digital images, the set of digital images of items is associated with a first category from among the categories, the first category is associated with a first content region, and other sets of digital images of items respectively are divided among categories associated with other of the user selectable content regions. The method where the input region includes a customized keyboard including an image region including the set of digital images of items. The method further including: completing an order transaction for the first item associated with the first digital image; generating a second digital image including a sentiment about the first digital image; and populating a support category included in the input region with the second digital image including the sentiment about the first digital image. The method where the set of digital images of items reflect items that are purchasable via an electronic commerce platform, and the provider node includes a server for receiving and responding to order transaction requests from the consumer node. The method further including: responsive to transmitting the first message, receiving a response including a response message confirming receipt of an order to purchase the first item. The method where the response message includes an electronic link selectable by the user via the input device to display an interface for completing payment for the first item. The method further including: completing a purchase transaction for the first item responsive to transmitting the first message; at the input device coupled to the computer processor, receiving a second user input selecting a second digital image from a second set of digital image items associated with providing feedback on the purchase transaction of the first item; at the computer processor, generating a second message including the second digital image, the second digital image depicting a user sentiment associated with the purchase transaction; and at the computer processor, including the second message including the second digital image in a second messaging element in the activity region displayed to the user on the display device, at least the first messaging element and the second messaging element including a messaging thread reflecting a transactional history associated with the first item; and at the communication unit coupled to the computer processor and associated with the consumer node, transmitting the second message including the second digital image via the public computer network as a second request to the provider node. The method further including: responsive to transmitting the second request, at the computer processor, receiving one or more of a support call from a customer service node and a response message addressing the user sentiment depicted by the second message. The order communication method further including: at the input device, receiving a second user input via the category region selecting a second tab corresponding to a second category different from the active category; determining the second category to be the active category; and displaying a second set of digital images of items in the image region that correspond to the second category. The order communication method further including: at the input device, receiving a third user input via the image region selecting a second digital image associated with a second item from the second set of digital images of items in the image region; at the computer processor, populating the activity region of the messaging application with a third message including the selected second digital image associated with the second item; at the communication unit, transmitting a second order for the second item via the public computer network to the provider node; at the communication unit, receiving a second response from the provider node via the public computer network confirming the receipt of the second order for the second item; and at the computer processor, populating the activity region of the messaging application with a fourth message confirming the receipt of the order for the second item, the activity region of the messaging application displaying a messaging thread including the first message, the second message, the third message, and the fourth message, the messaging thread reflecting a transactional history of the first order and the second order. The order communication method where the image region is scrollable. The order communication method where the first tab is highlighted when the first category is the active category. The computer system where the graphical asynchronous messaging user interface includes user selectable content regions for categories of digital images, the set of digital images of items is associated with a first category from among the categories, the first category is associated with a first content region, and other sets of digital images of items respectively are divided among categories associated with other of the user selectable content regions. The computer system where the input region includes a customized keyboard including an image region including the set of digital images of items. The computer system where the instructions, when executed by the computer processor, further cause the computer system to perform operations including: completing an order transaction for the first item associated with the first digital image; generating a second digital image including a sentiment about the first digital image; and populating a support category included in the input region with the second digital image including the sentiment about the first digital image. The computer system where the set of digital images of items reflect items that are purchasable via an electronic commerce platform, and the provider node includes a server for receiving and responding to order transaction requests from the consumer node. The computer system where the instructions, when executed by the computer processor, further cause the computer system to perform operations including: responsive to transmitting the first message, receiving a response including a response message confirming receipt of an order to purchase the first item. Implementations of the described techniques may include hardware, a method or process, or computer software on a computer-accessible medium.

One general aspect includes an order communication method including: at a computer processor, loading a keyboard software object that renders a keyboard interface including an image region and a category region, the category region including a plurality of user-selectable tabs corresponding to a plurality of different categories, the plurality of user-selectable tabs being visually distinguishable; at the computer processor, determining a first category as an active category from the plurality of different categories, the active category being associated with a first tab; at the computer processor, displaying a first set of digital images of items in the image region that correspond to the active category, the digital images of the first set being user-selectable via the keyboard interface to message in association with a first order transaction; at an input device coupled to the computer processor, receiving a first user input via the image region selecting a first digital image associated with a first item from the first set of digital images of items in the image region; at the computer processor, populating an activity region of a messaging application with a first message including the selected first digital image associated with the first item; at a communication unit coupled to the computer processor and associated with a consumer node, transmitting a first order for the first item via a public computer network to a provider node; at the communication unit coupled to the computer processor, receiving a first response via the public computer network confirming receipt of the first order for the first item; and at the computer processor, populating the activity region of the messaging application with a second message confirming the receipt of the first order for the first item. Other implementations of this aspect include corresponding computer systems, apparatus, and computer programs recorded on one or more computer storage devices, each configured to perform the actions of the methods.

Implementations may include one or more of the following features. The order communication method further including: at the input device, receiving a second user input via the category region selecting a second tab corresponding to a second category different from the active category; determining the second category to be the active category;

and displaying a second set of digital images of items in the image region that correspond to the second category. The order communication method further including: at the input device, receiving a third user input via the image region selecting a second digital image associated with a second item from the second set of digital images of items in the image region; at the computer processor, populating the activity region of the messaging application with a third message including the selected second digital image associated with the second item; at the communication unit, transmitting a second order for the second item via the public computer network to the provider node; at the communication unit, receiving a second response from the provider node via the public computer network confirming the receipt of the second order for the second item; and at the computer processor, populating the activity region of the messaging application with a fourth message confirming the receipt of the order for the second item, the activity region of the messaging application displaying a messaging thread including the first message, the second message, the third message, and the fourth message, the messaging thread reflecting a transactional history of the first order and the second order. The order communication method where the image region is scrollable. The order communication method where the first tab is highlighted when the first category is the active category. The computer system where the graphical asynchronous messaging user interface includes user selectable content regions for categories of digital images, the set of digital images of items is associated with a first category from among the categories, the first category is associated with a first content region, and other sets of digital images of items respectively are divided among categories associated with other of the user selectable content regions. The computer system where the input region includes a customized keyboard including an image region including the set of digital images of items. The computer system where the instructions, when executed by the computer processor, further cause the computer system to perform operations including: completing an order transaction for the first item associated with the first digital image; generating a second digital image including a sentiment about the first digital image; and populating a support category included in the input region with the second digital image including the sentiment about the first digital image. The computer system where the set of digital images of items reflect items that are purchasable via an electronic commerce platform, and the provider node includes a server for receiving and responding to order transaction requests from the consumer node. The computer system where the instructions, when executed by the computer processor, further cause the computer system to perform operations including: responsive to transmitting the first message, receiving a response including a response message confirming receipt of an order to purchase the first item. Implementations of the described techniques may include hardware, a method or process, or computer software on a computer-accessible medium.

One general aspect includes a computer system, including: an input device; a computer processor coupled to the input device via a communication bus; a display device coupled to the computer processor via the communication bus; a communication unit coupled to the computer processor via the communication bus; a computer memory coupled to the computer processor via the communication bus, the computer memory storing instructions that, when executed by the computer processor, cause the computer system to perform operations including: generating a graphical asynchronous messaging user interface including an input region containing a set of digital images of items and an activity region displaying graphical messaging elements respectively representing messages sent between a consumer node and a provider node; displaying the graphical asynchronous messaging user interface at the display device; receiving a user input at the input device via the input region, the user input selecting a first digital image associated with a first item from the set of digital images of items in the input region; generating a first message including the first digital image associated with the first item; including the first message including the first digital image associated with the first item in a first messaging element in the activity region displayed to the user on the display device; and transmitting the first message via the communication unit via a public computer network as a request to the provider node. Other implementations of this aspect include corresponding computer systems, apparatus, and computer programs recorded on one or more computer storage devices, each configured to perform the actions of the methods.

Implementations may include one or more of the following features. The computer system where the graphical asynchronous messaging user interface includes user selectable content regions for categories of digital images, the set of digital images of items is associated with a first category from among the categories, the first category is associated with a first content region, and other sets of digital images of items respectively are divided among categories associated with other of the user selectable content regions. The computer system where the input region includes a customized keyboard including an image region including the set of digital images of items. The computer system where the instructions, when executed by the computer processor, further cause the computer system to perform operations including: completing an order transaction for the first item associated with the first digital image; generating a second digital image including a sentiment about the first digital image; and populating a support category included in the input region with the second digital image including the sentiment about the first digital image. The computer system where the set of digital images of items reflect items that are purchasable via an electronic commerce platform, and the provider node includes a server for receiving and responding to order transaction requests from the consumer node. The computer system where the instructions, when executed by the computer processor, further cause the computer system to perform operations including: responsive to transmitting the first message, receiving a response including a response message confirming receipt of an order to purchase the first item. Implementations of the described techniques may include hardware, a method or process, or computer software on a computer-accessible medium.

The features and advantages through this document are not all-inclusive and many additional features and advantages will be apparent to one or ordinary skill in the art in view of the figures and description. Moreover it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

The technology disclosed by this document relates to transactional, image-based asynchronous electronic communication in association with a novel transactional platform. In some implementations, the platform is a message-based ecommerce platform that simplifies and greatly improves the traditional e-commerce experience, although other uses are also applicable and contemplated.

At the outset, it is noted that, to ease description, some elements of the system and/or the methods are referred to in the Description and the Claims using the labels first, second, third, etc. These labels are intended to help to distinguish the elements but do not necessarily imply any particular order or ranking unless indicated otherwise.

Figure 4A:
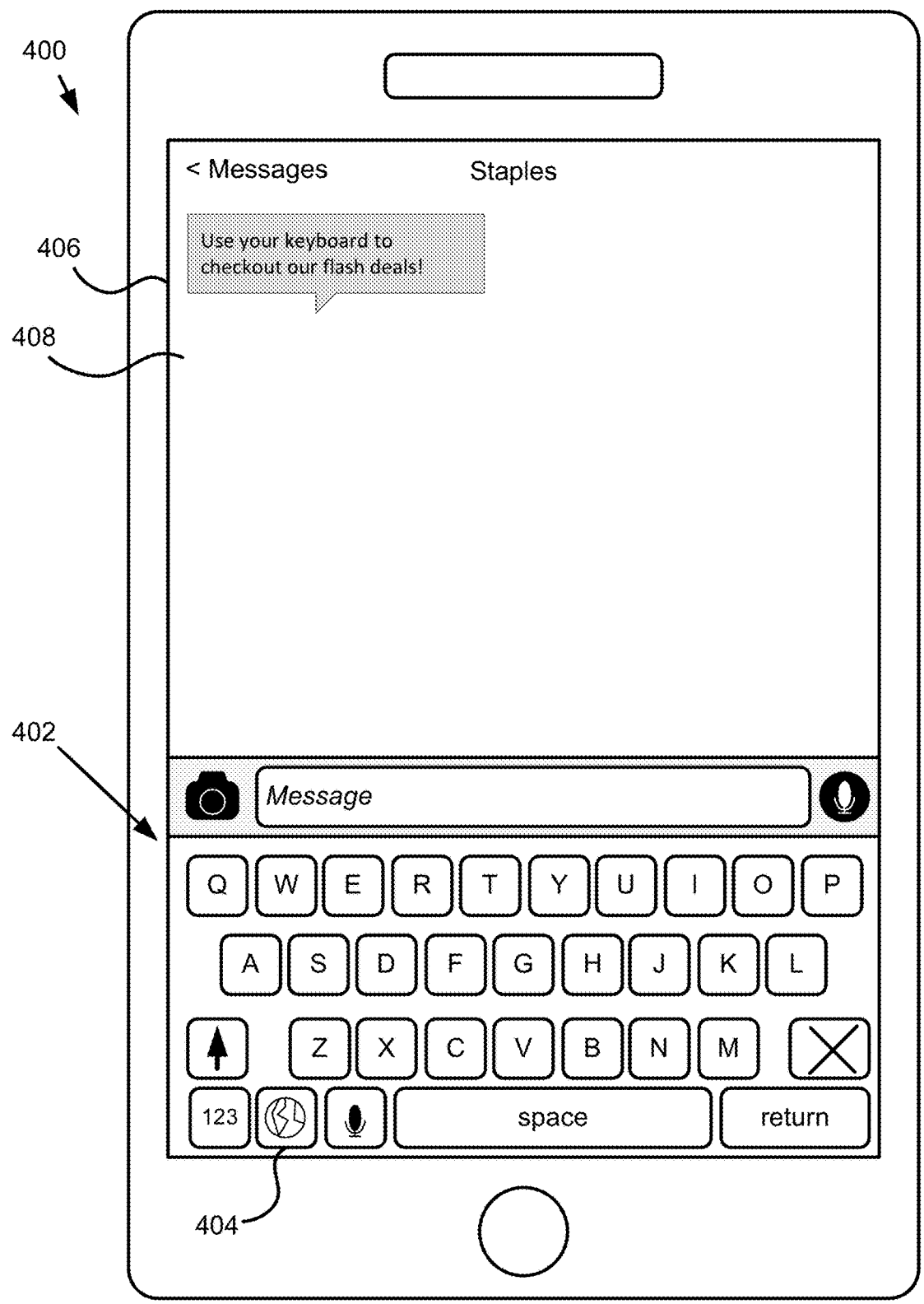
FIGS. 4A-4D are graphical representations of example graphical user interfaces for performing transactions via an asynchronous electronic communication medium.
Figure 4B:
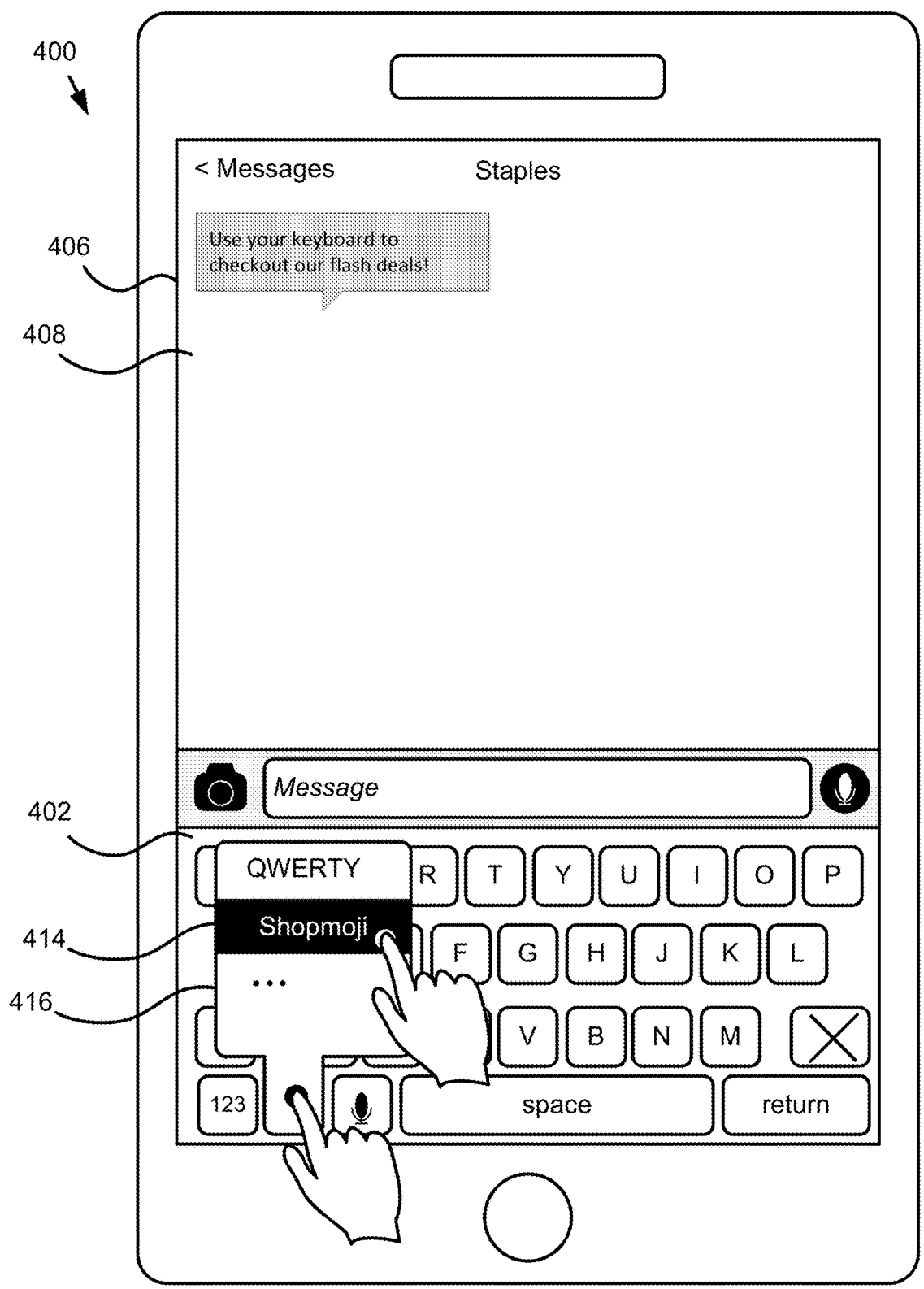
Figure 4C:
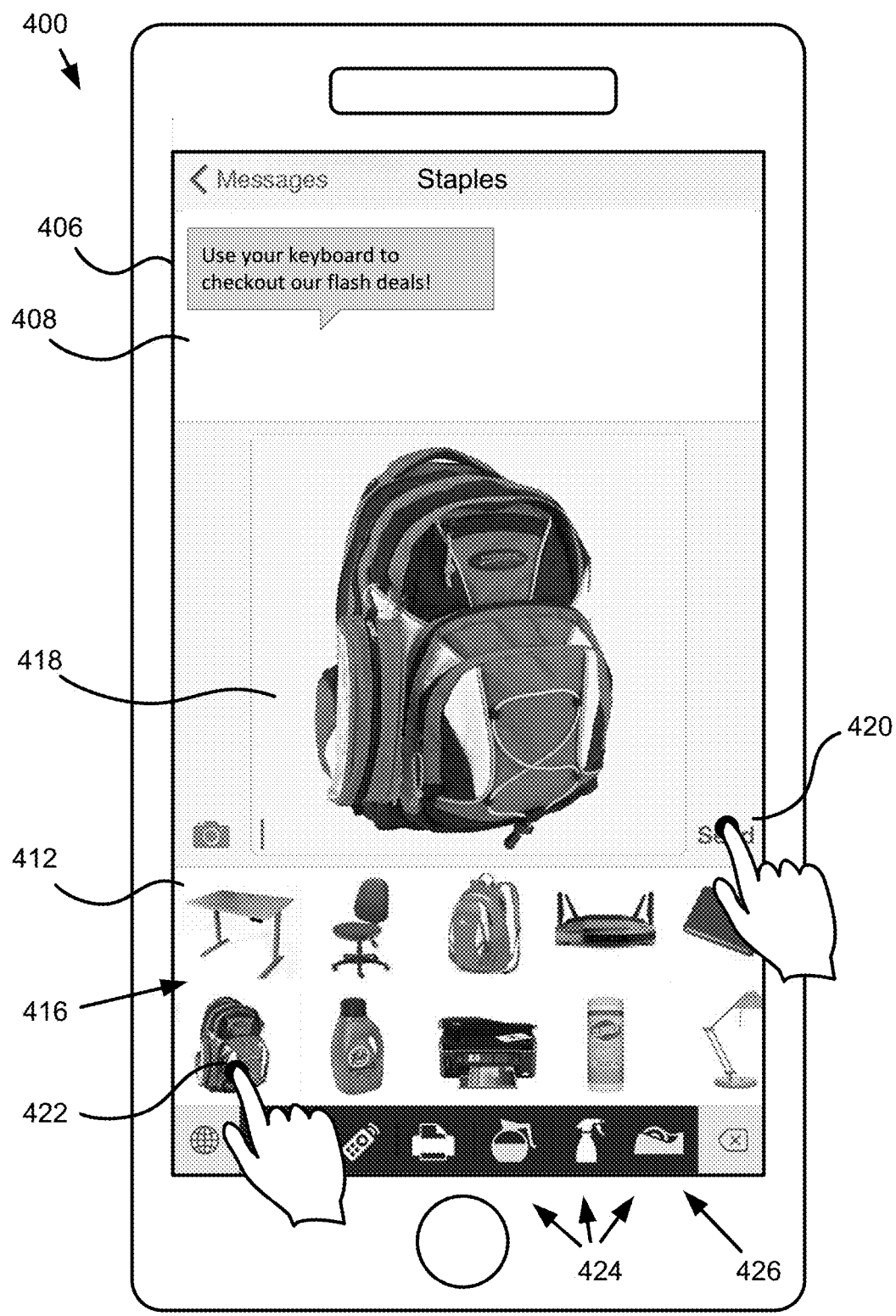
Figure 4D:
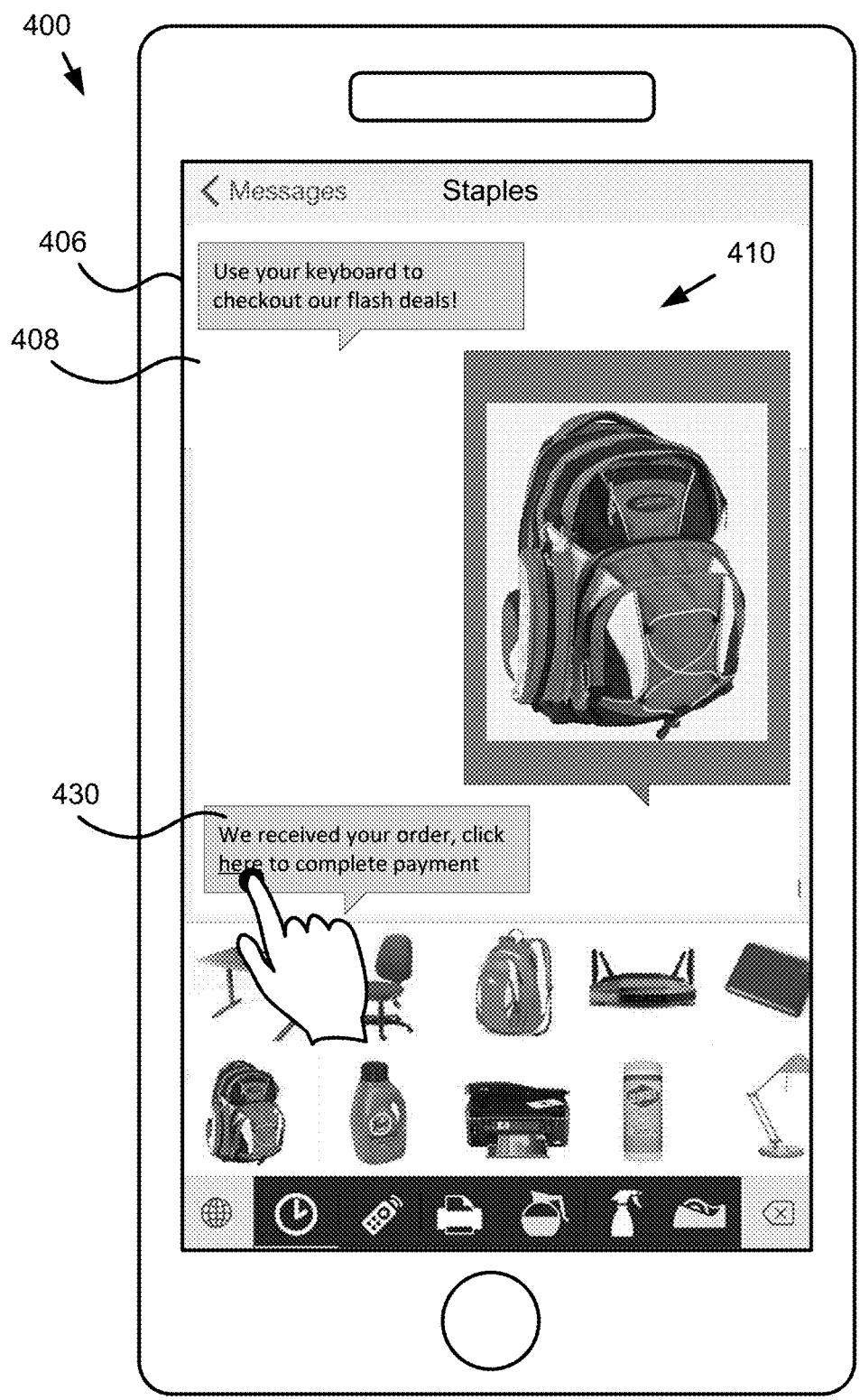

As shown in FIGS. 4A-4C, the platform provides technology enabling endpoints of a network to perform transactions via an asynchronous electronic communication medium, such as a messaging application 406. Non-limiting examples of such an application 406 include a messaging application (e.g., chat, SMS, etc.), an email client, etc.

Via the application 406, order/reordering of items is as convenient as selecting a product image from a transactional, image-based soft keyboard (TIK) 412. The TIK 412 may be downloaded and installed by the mobile device 400 of the user, typically in response to a user input requesting the install, although in further implementations the keyboard 412 may be installed in other ways, e.g., as a default soft keyboard included with the operating system of the mobile device 400, etc.

In the implementation depicted in FIG. 4A, a graphical asynchronous messaging user interface 408 is shown that initially includes an initial keyboard 402 (e.g., QWERTY) that includes a user-selectable keyboard selector element 404, which the user may select to access a graphical menu 416 including a user-selectable interface element 414 for loading and displaying the TIK 412, as shown in FIG. 4B. Upon selection of element 414, the messaging application 406 loads and displays the TIK 412. In some instances, selection of the element 414, signals an event handler of the application 406 to load the required classes and/or objects, load the keyboard template, download and/or load graphics, etc., from the non-transitory memory of the mobile device 400 to effectuate implementation of the TIK 412.

As shown in FIG. 4C, the TIK 412 may include one or more sets of digital images 416 arranged in any number of graphical image categories 424. A digital image means a still or motion image having any suitable image format and depicting pictorial and/or textual imagery. As shown, the interface 408 may include a category region including a plurality of user-selectable category image elements representing different categories 424.

Each category 424 may contain any number of images 416 representing items that can be purchased via the messaging application 406. To order particular item(s), the user may type the corresponding image(s) of the item(s) (e.g., image 422) into the messaging field 418 of the interface 408, and then select a user-selectable send element 420 to send the graphical phrase of typed product image(s) to an electronic address of the designated recipient, which in this case is a phone number designated for ordering products via an e-commerce platform (e.g., provided by Staples), but it should be understood that other types of electronic addresses (e.g., email, a user handle, a unique ID, etc.) are possible are also possible and contemplated.

As discussed elsewhere herein, categories 424 may segment the sets of images 416 across different domains. In some implementations, a category 424 may include images corresponding to daily deals that the merchant associated with the e-commerce application 124 is offering that day and may be updated on a routine basis (e.g., daily, the product sells out, etc.). Additionally or alternatively, categories 424 may include a category 424 including images 416 representing items that are popular among the customers of the merchant, a category 424 including images 416 representing items from which that the customer routinely buys items, a category including images of new or featured items, a category 424 including images 416 of recently viewed or purchased items, categories that an e-commerce application (e.g., 124 in FIG. 1) has learned based on prior purchases by other customers that are similar to the customer, etc., a category 424 including images 416 of rewards certificates that the user has earned based on prior purchases and that the user can select to include in the items being messaged (e.g., see example image 800 in FIG. 8), a category 424 including images 416 reflecting different types of feedback (e.g., see the description of FIGS. 6 and 7 below), categories 424 including respective images 416 reflecting items being offered by different merchants (e.g., images of items offered by competing merchants, such as specials, daily deals, items by category, etc.), or other suitable categories 424 such as alphabetically ordered categories 424 including respectively images 416 of available items, a user-defined set of categories 424, various combinations of the foregoing, etc. In some cases, an image 416 of the same item may be included in more than one category depending on the makeup of categories. In further examples, the images 416 may be uncategorized.

The e-commerce application 124 (e.g., see FIG. 1) receives the message including the image(s) messaged by the user in FIG. 4C. In some implementations, each image is a graphical object that includes metadata about the item depicted by it, such as the item ID, price, date, time, etc. The e-commerce application 124 includes a parser that extracts the metadata from the image object and identifies the item comprising the metadata. The metadata items may be offset or tagged with suitable characters or spacing to make them identifiable. The e-commerce application 124 then uses the metadata items to determine which item was requested and places an electronic order for the item.

Responsive to placing the order for the item, the e-commerce application 124 may generate and transmit a confirmation message to the client application 106. Responsive to receiving the client confirmation message, the client application 106 may update the interface of the client application 106 with the confirmation message to display to the user. The message thread depicted in interface to be preserved over time so the user can track historical purchases and seamlessly interact with the online merchant post-purchase, as discussed further below.

In the implementation depicted in FIGS. 4A-4D, the user selected the items for purchase from the keyboard. It should be understood that other variations are also possible. For example, in the implementation depicted in FIGS. 5A-5B, an e-commerce application 506 is programmed to generate and display an interface that displays a set of navigable (e.g., scrollable) categories 424 on a mobile device 500. Each category 424 includes a set of images representing items available for purchase. These categories 424 may be the same or similar to those discussed above with respect to the categories included in the keyboard and for the purposes of brevity will not be discussed further here.

Figure 5A:
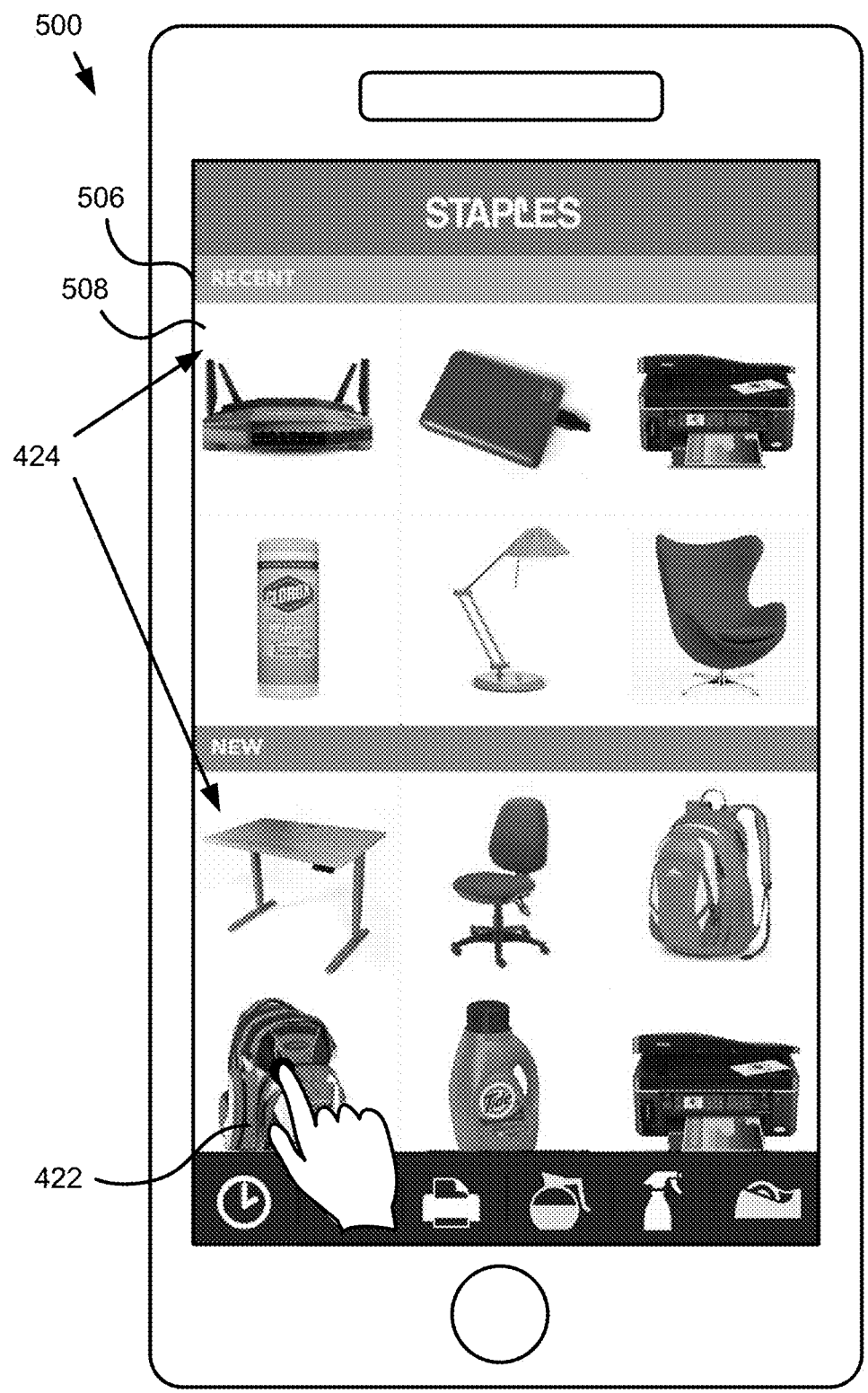
FIGS. 5A and 5B are graphical representations of example graphical user interfaces for an e-commerce application.
Figure 5B:

As shown in FIG. 5A, upon selection of an item image 422 (or images) depicted in the scrollable interface 508 (e.g., the image of the backpack), the e-commerce application 506 may detect the selection of the item image(s) (e.g., via an event handler) and signal the messaging application 406 to insert the item image(s) into the message and transmits it to a certain electronic address, such as the electronic address noted above designated for customer orders. For example, the e-commerce application 506 may call a software routine (an API) surfaced by the messaging application 406 that allows the e-commerce application 506 to create a message that includes the selected image(s), and in doing so redirects the user to an interface that includes the message. For instance, with reference to FIG. 4D, the e-commerce application 506 may signal the messaging application 406 depicted in FIG. 4D to create and insert the bubble 430 including the selected image 422 of the backpack.

In some implementations, upon detecting the selection of the item image, the e-commerce application 506 may present an intermediate interface 510 that allows the user to select the communication medium/channel via which the item(s) should be ordered (e.g., the messaging application 406). Responsive to the presentation of the intermediate interface 510, the user may select a desired medium, such as the messaging application 406 as depicted, and the selected medium, using the data provided by the e-commerce application 506 (e.g., the image data, item data associated with the image, etc.) may generate the message in cooperation with the application corresponding to that medium as described above. Example mediums/channels include text messaging applications, instant messaging applications, email, social network messaging applications, microblog applications, etc.

Figure 2A:
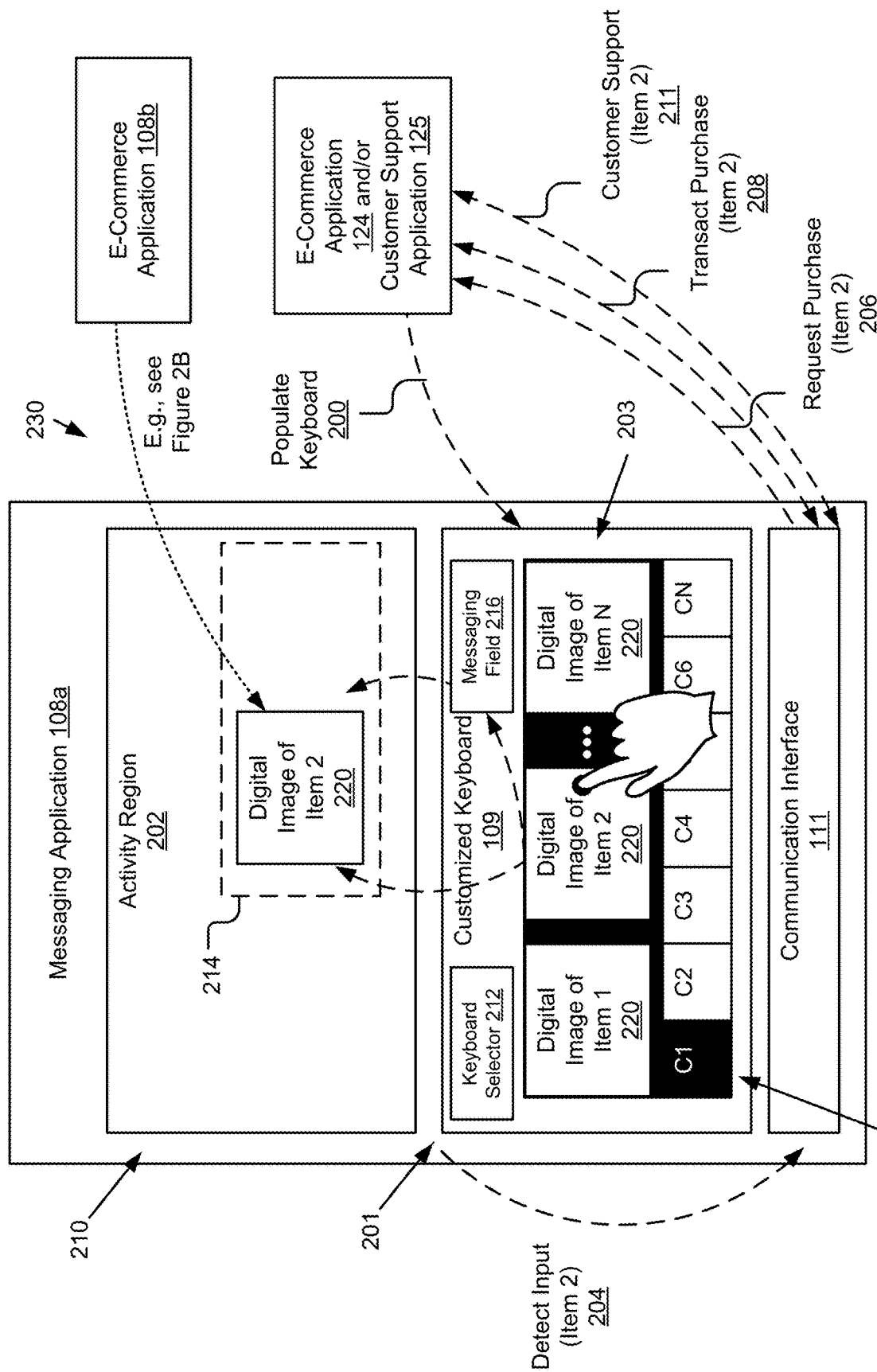
FIGS. 2A and 2B are example method and data flow diagrams for transactional messaging.
Figure 2B:
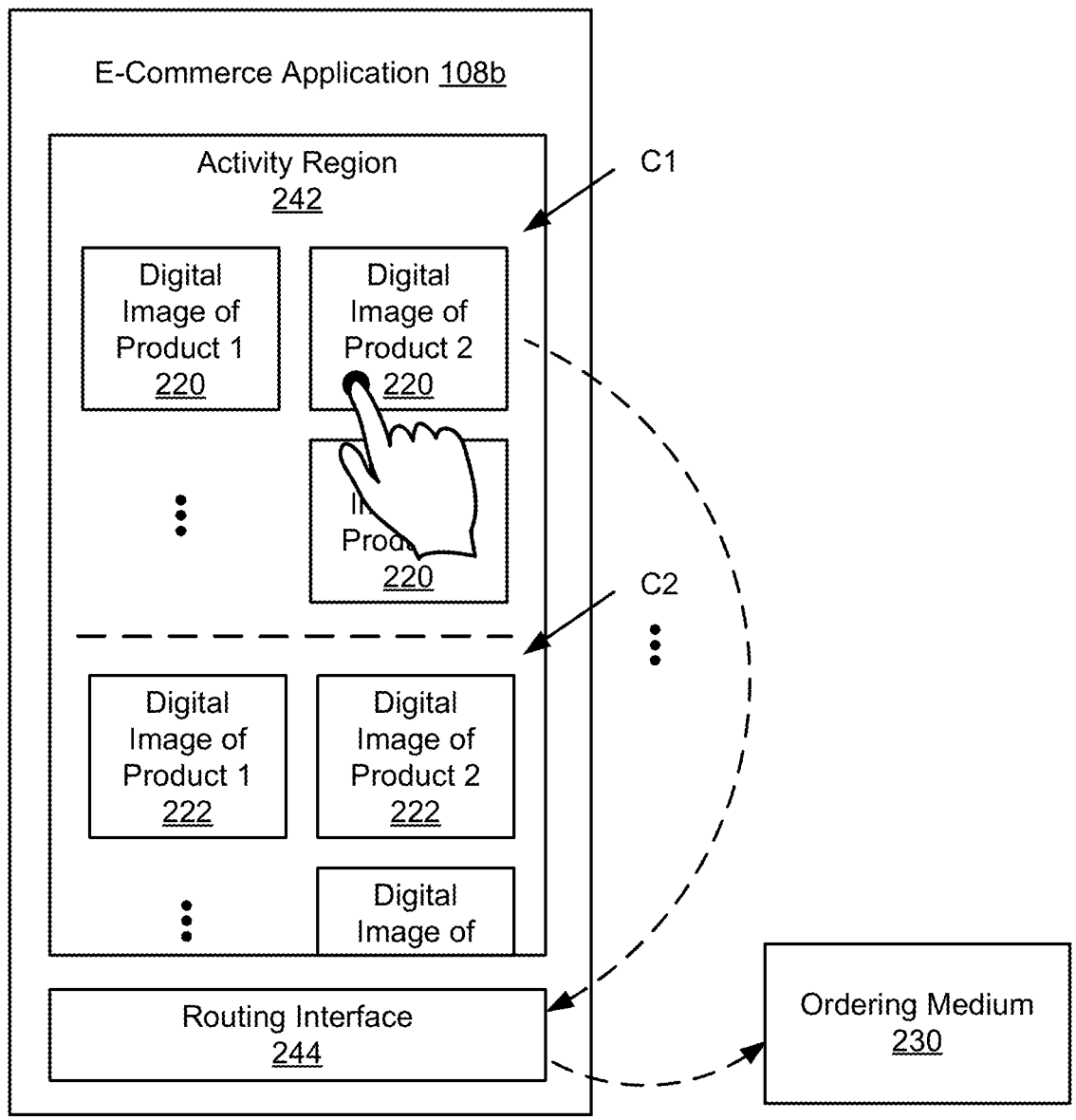

FIGS. 2A and 2B are method and data flow diagrams for transactional messaging using the unique e-commerce platform described in this document. In particular, as shown in FIG. 2A, the client application 108, which in this case is an instance of a messaging application 108c, includes an activity region 202, an input region 201, and a communication interface 111.

The input region 201 includes a customized soft or on-screen keyboard 109 that may be dynamically adapted over time. To switch keyboards, the messaging application 108c also includes a keyboard selector 212 of the lesson user to switch between other keyboards, such as text-based keyboards (e.g., QWERTY) and the depicted keyboard 109, to which the user may switch to enter other characters.

The input region 201 and/or keyboard 109 may include an image region 203 including one or more sets of digital item images. The one or more sets of digital images may be segmented by category, in which case the input region 201 and/or keyboard 109 may include a category region 205 including a set of one or more categories (e.g. C1-CN). Each category may include a set of digital images representing items purchasable via the e-commerce platform. For example category C1 includes a set of digital images 220 of items (e.g., item 1, item 2, . . . item N). The user may select between the categories by selecting the category elements (e.g., tabs, icons, buttons, etc.) although other selection mechanisms are also possible and contemplated. In some implementations, each category may be associated with a tab, which is user selectable to make the category the active category. In some cases, the active category tab may be highlighted to distinguish it from the inactive categories. The categories may be visually distinguishable. And selecting between the categories may change the images displayed in the image region, or in cases where multiple categories of images are displayed in the image region, may scroll the image region to the set of images associated with the selected category. Other variations are also possible and contemplated.

In some implementations, responsible to the selection of a category tab (which activates it), the customized keyboard 109 may display the corresponding set of digital images of items in the image region 203.

In some implementations, the customized keyboard 109 may be embedded in the messaging application 108 as a first-party or third-party add-in module. In some implementations, the customized keyboard 109 may be natively included in the messaging application 108. Other variations are also possible and contemplated. Various non-limiting options for installation and/or provision of the customized keyboard 109 are described elsewhere herein, such as with reference to FIGS. 4A-4D.

In the depicted implementation, the user selects the digital image 220 of item 2 via the keyboard. Responsive to the selection, the messaging application 108c detects 204 the input (e.g. selecting item 2) and updates the interface 210 to place the digital image of item 2 in the activity region 202. In some further implementations, the messaging application 108c may receive the selected item image(s) from an external source, such as an instance of an e-commerce application 108b (e.g., see FIG. 2B), which may also be installed on the client device 106, and may populate (e.g., update the interface 210 to place a digital image of the item 2 in) the activity region 202 responsive thereto.

The customized keyboard 109 and/or the communication interface 111 may populate the activity region 202 with messages input by the user on a consumer node and/or received from other nodes on the network (e.g., a provider node such as the server 122 or the third-party server 118).

When placing the image in the activity region 202, the messaging application 108c may immediately message the digital image of item 2 to the intended recipient of the message, and in association with that step, place a visual depiction of the message including image that was sent in the activity region 202, such as the graphical messaging element 214 (e.g., the bubble) including the image 220.

Alternatively, the messaging application 108c may insert the selected item image 220 in a message creation field 216. The user may further input information in the messaging field, such as type text and other images into the field, and select a graphical send element (e.g., send button, send icon, etc.) once finished composing the message. The messaging application 108c may detect a send event responsive to the selection of the send element by the user, generate a message that includes the selected item image 220 and any other data composed by the user in the messaging field, inject a representation of the message in the messaging stream/thread depicted in the activity region 202, and send the message.

The communication interface 111 may generate and transmit the message including the item image(s), and in some cases any other information composed by the user in the input region 109, as a purchase request 206 using a standard messaging protocol to the e-commerce application 124. The e-commerce application 124 receives the purchase request 206, and responsive to that, transacts the item purchase as reflected by line 208.

The server 122 may store data store for transacting the purchases of items and providing support for the purchase(s). The data store may be organized and queried using various criteria including any type of data stored by them, such as a user/customer identifier, rewards account number, product identifier, product name, product category, tags, locations, merchant, user device, electronic address, where products were purchased from, sequence of products bought by an account, etc. The data store 208 may include data tables, relational/semi-structured/graph/etc., databases, or other organized or unorganized collections of data. Examples of the types of data stored by the data store 208 may include, but are not limited to, user profile data, category data, product data, pricing data, item image data, feedback image data, etc., as discussed elsewhere herein.

The customer support application 125 may send and receipt support messages from instances of the messaging application 108 via the communication interface 111. The messages received from the customer support application 125 may seamlessly be injected into a transactional messaging thread in the activity region 202 of the messaging application 108. For instance, a user may text a support image in a support request to the customer support application 125 indicating a satisfaction or dissatisfaction with item 2 as shown by signal line 211, which the customer support application 125 may parse to determine the applicability of the support image and automatically respond instantaneously (e.g., via a response message, phone call, updating systems, etc.) to address any lingering issues with the order of item 2, as discussed elsewhere herein. The customer support application 125 may access the data stored by the server 122 (e.g., by itself, the e-commerce application 124 and/or another component) to associate the support image with the particular order and user, so that proper support may be provided.

The user profile data describes the users of the computing environment 100. The user profile data includes the user accounts of the users and stores attributes describing the users. Non-limiting examples of user attributes include an e-mail address, IP address, demographics data, user id, rewards account number, item identifiers, etc. In some implementations, the user profile data includes information learned from user behavior (e.g., interaction data) through various computer-learning methods, as discussed elsewhere herein. In some implementations, the user profile data includes information provided by a user, such as a username, password, preference data, payment information, etc. The user profile data may include interaction data tracking current and past transactions with the server 122 and, in some implementations, other servers (e.g., a third-party server 130). The transaction data includes order history data, support history data, fulfilment data, and user behavior data.

The category data includes a set of item categories. Each category may include a plurality of items (e.g., products, services, etc.). The items included in the categories may be linked with the items in the item data using unique item identifiers. Each category may be uniquely identified using a category ID. Item data includes a plurality of product records respectively describing items currently or previously available via the e-commerce engine 124. Users may interact with unique customized interfaces (e.g., soft keyboards, application interfaces, etc.) presented by the computing environment to browse and/or purchase items. Each item record may describe the various aspects of the items. Each record may include one or more item tags characterizing the item. Each record may also include item images, unique item identifiers, names, descriptions, manufacturer info, specifications, reviews, predicted probabilities of recommendations of reviews, ratings, etc. for items.

In some implementations, each installation instance of a keyboard may be registered to a particular user ID in the data store. This data may be stored as keyboard data. The keyboard data store a list of item image categories for the keyboards, as well as data describing which images should be included in the image categories. In some implementations, a category may be unique to a particular user or set of users, or may be generally applicable to all users. The keyboard data may include data correlating which categories should be associated with which users. In some implementations, the keyboard data may include image data reflecting which sets of images should be included in which categories. For example, sets of images may be determined on a routine basis (e.g., hourly, daily, certain day of week, weekly, seasonally, etc.) to reflect new items available for purchase on the platform, items on promotion, items personalized to a user based on preference or order history, etc., and may be associated by the keyboard data with corresponding categories. A set of image data may be unique to a given user or set of users, or may be applicable to all users. In some implementations, some or all users may have the same set of categories available for perusal, but the sets of images respectively included in those categories may be the same or unique depending on the category (e.g., daily deals may be the same but personalized items may be different). Other variations are also possible and contemplated.

In some implementations, the e-commerce application 124 may query the keyboard data to determine which images to populate the various instances of the customized keyboards 109 installed on the various client devices 106 in the system 100. It should be understood that the server 122 and/or client device 106 may store and/or process any of the data described herein. For instance, the client device 106 15 may include an instance of the data store of the server 122, may cache data from the data store (e.g., download keyboard data, item data, category data, etc., at various intervals), etc. For instance, the data may be pre-stored/installed in the client device 106, stored and/or refreshed upon setup or first use, replicated at various intervals, etc. In further implementations, data from the server 122 may be requested/downloaded at runtime. Other suitable variations are also possible and contemplated.

FIG. 2B shows a block diagram of an example client application 108, which in this instance is an e-commerce application 108b. The e-commerce application 108b includes an activity region 242 and a routing interface 244. The activity region 242 includes categories (e.g., C1, C2, etc.), each including a set of item images as described elsewhere herein. Upon selection of one or more of the item images, such as item image 220, which is a digital image of item 2, the routing interface 244 signals the intended ordering medium 230, as discussed above, to message the item to the intended recipient for purchase.

The unique message-based an image-based e-commerce ordering platform described above is beneficial because it allows the user to immediately order or reorder items right from their keyboard or a simple image-based catalog without having to click though a number of tedious steps that are typically required by a traditional e-commerce website site (e.g., browse items, add to cart, view cart, checkout, etc.). Further, in some implementations, a single interface may be used that persistently includes the order history for an ordered item or items, eliminates having to load numerous interfaces and process numerous requests in order for a user to purchase the order, determine the status of his/her order, provide feedback on the order, etc. This improves the computational load on the system 100 while providing a simplified, streamlined experience for the user.

Figure 6:
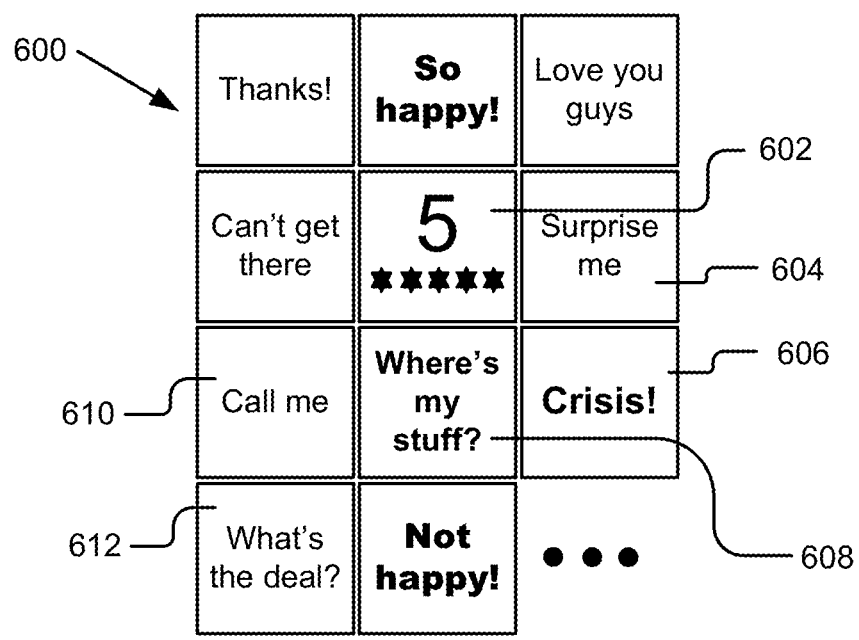
FIG. 6 is a diagram showing an example feedback category.
Figure 7:
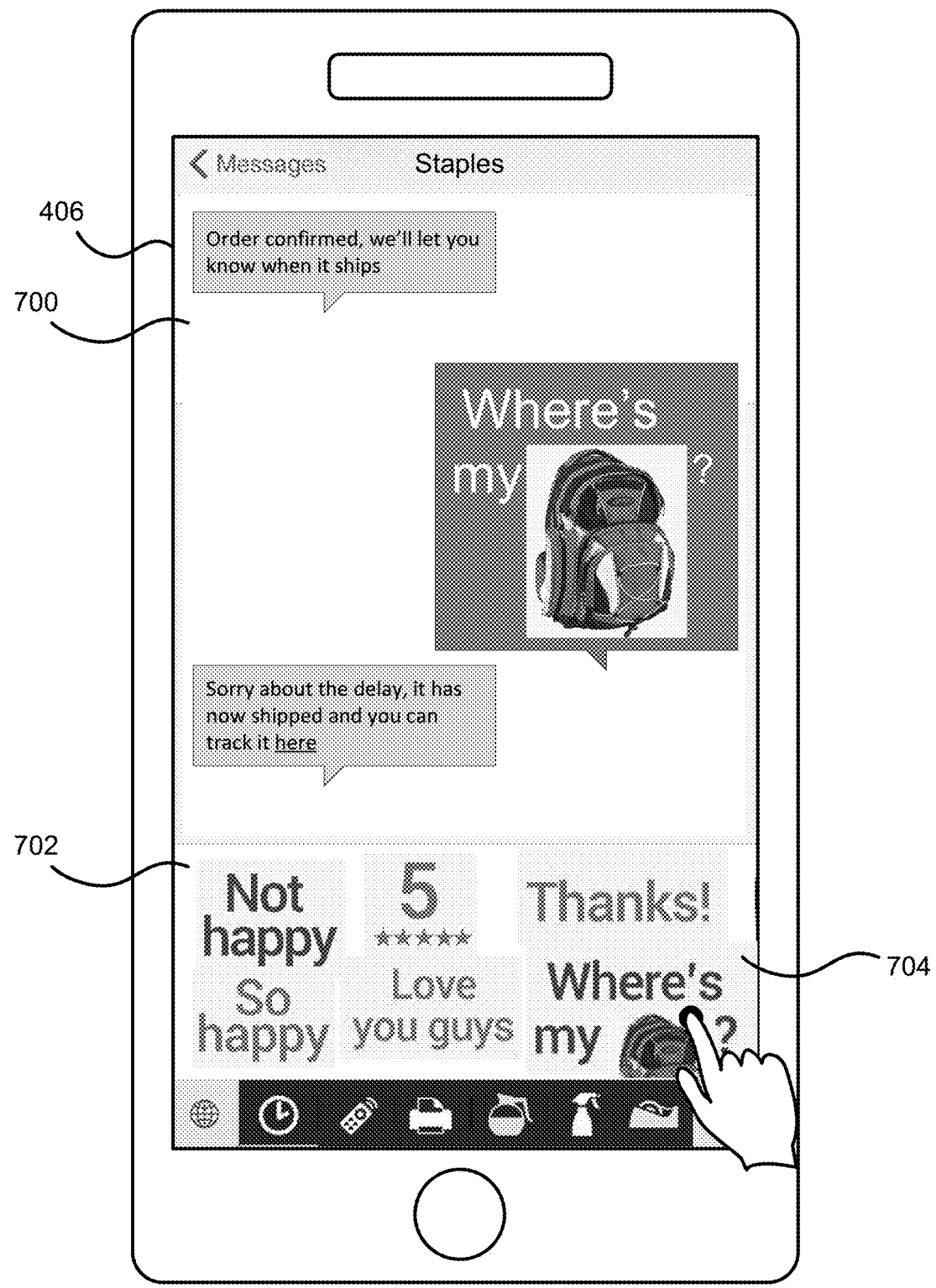
FIG. 7 is a graphical representation of an example transactional messaging interface showing a transition from a purchase transaction to a customer support transaction.
Figure 8:
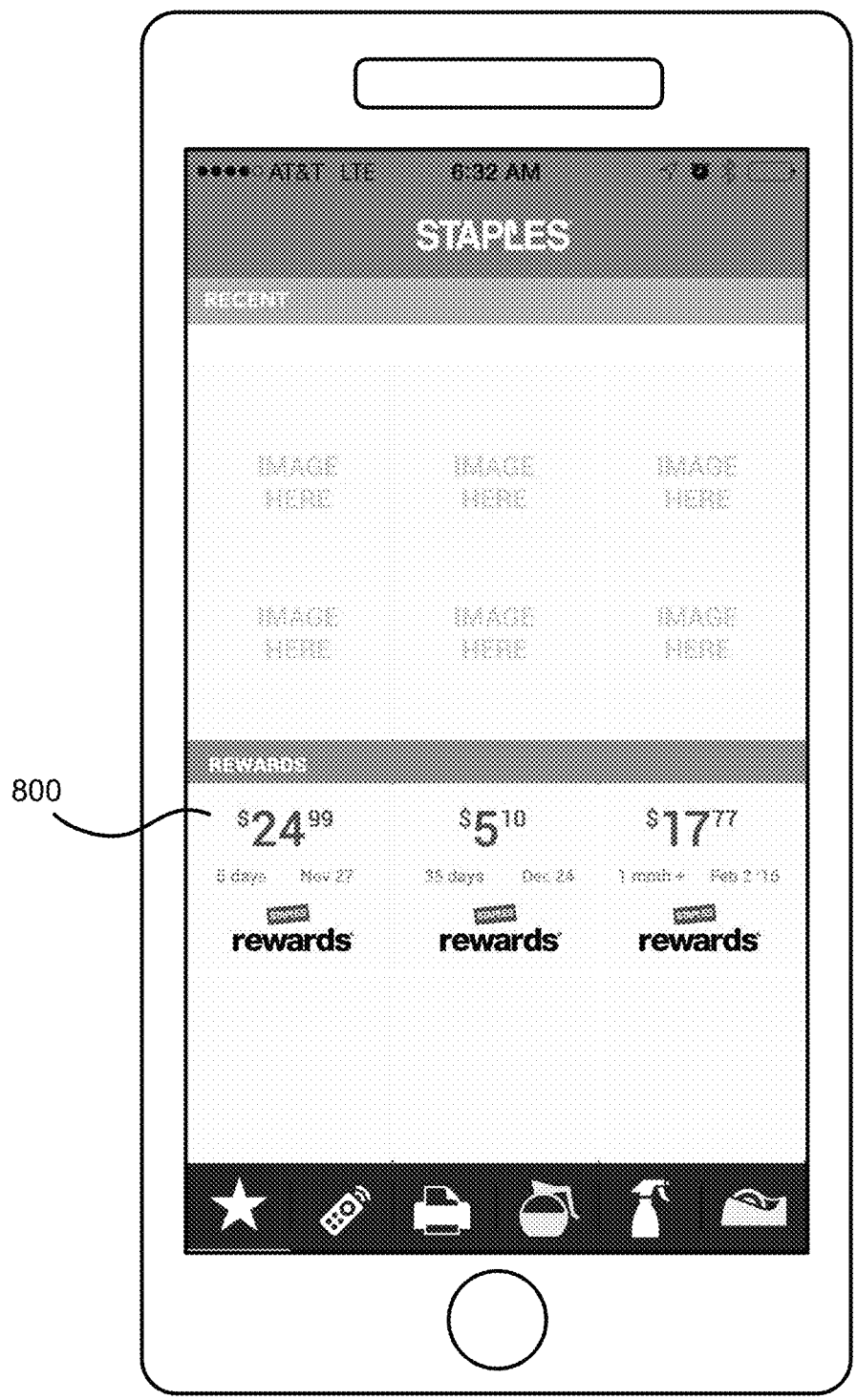
FIG. 8 is a graphical representation of an example rewards certificate in a graphical user interface.

In addition to the above-discussed features and benefits, the message-based e-commerce platform provides further advantages, such as a seamless post-purchase customer service experience. For example, as depicted in FIGS. 6 and 7, at least one category included in the keyboard or the image-based e-commerce application may be a customer support category that includes a set of images that reflect common user sentiments after purchasing items. Some of those sentiments may be complaints about the purchase experience for the item itself. Other sentiments may include praise about the same. Numerous other sentiments are also possible and contemplated.

FIG. 6 is a diagram showing an example feedback category 600 including digital images of sentiments that a user may have about a particular transaction using the platform described herein. In particular, FIG. 6 depicts an example category 600 including a plurality of different digital feedback images reflecting different positive and negative sentiments about a transaction. For example, image 602 is user selectable to instantly rate the provider with the highest possible rating (e.g., five stars) in a digital marketplace that is accessible by other users, such as in the search engine (e.g., Google™ search, etc.), and application marketplace (e.g., Google™ Play, Apple™ App Store, etc.), and/or other marketplaces. Image 604 is user selectable to request for a personalized message including a promotion on an item (e.g., special discount, etc.), which may be computed by the e-commerce application 124 based on data stored in a data store of the e-commerce application 124, such as data reflecting unique item IDs corresponding to items ordered by the user in the past. Image 606 is user selectable to request customer service soon as possible, when time is of the essence. Image 608 is user-selectable to request a fulfillment update from the e-commerce application. Image 610 is user-selectable to request a return call (e.g., so the user can talk to a customer service representative or account representative). Image 612's user-selectable to indicate to a customer service representative that there is an issue and to request a return response.

FIG. 7 is a graphical representation of an example transactional messaging interface 700 showing a transition from a purchase transaction to a customer support transaction. In FIG. 7, the user placed an order for a backpack, but no confirmation information was sent within a certain period of time (e.g., a few days, a week, etc.). Accordingly, the user opened the messaging thread the messaging application 406 in which he or she purchased the backpack, selected via the customized keyboard the image-based keyboard category that included an image 704 depicting the sentiment "where's my backpack," and selected that image. Once the image was input and/or sent by the user, the messaging application 406 transmitted, in response, a message including the sentiment image to the e-commerce application 124. The e-commerce application 124 generated and sent a response to acknowledge the customer's frustration and automatically provided a status update about the item order, which in this case was a message including electronic link to a page including shipping and tracking information, which is user selectable to navigate to a browser to view the shipping information in real-time in an interface rendered by the browser using unique URL included in the electronic link.

Using the interface elements in FIGS. 6 and 7, the user may easily select a sentiment that reflects his or her feelings and immediately message it to customer support in the same messaging thread in which the item was purchased. The sentiment images, like the item images, may dynamic, meaning they may be situationally updated and customized.

In some implementations, the e-commerce application 124 may automatically update the feedback images presented in a customized keyboard of the application 406 based on the items that the user has ordered. For example, e-commerce application 124 may automatically generate images 220 for inclusion in a feedback category using images associated with the unique item IDs of items for which the user has completed transactions (e.g., purchased). As shown in FIG. 7, the image 704 includes a depiction of the backpack that the user ordered and for which the user is awaiting delivery. Based on data stored in the data store of the e-commerce application 124, such as the order history of the user (e.g., timestamp of the order, item IDs associated with the order, user ID associated with the order, delivery status for the order (e.g., whether the order is left distribution center, is en route, is delayed for a given reason, etc.)), the e-commerce application 124 may compute that the backpack has not yet been delivered, and may automatically generate the image 704 including a depiction of the backpack and a sentiment asking where it is, and may transmit the image to an instance of the customized keyboard 109 for inclusion in the set of images associated with the feedback category. Numerous other variations are also possible and contemplated. For instance, the e-commerce application 124 includes data indicating that the item(s) (e.g., the backpack) have been delivered to a premises associated with the user, and data indicating that the user has not yet provided feedback about the transaction, the e-commerce application 124 may generate an image including a digital representation of the item(s) (e.g., the backpack) and a positive, neutral, or negative sentiment about the item(s) and/or the transaction (e.g., arrive damaged, perfect, took too long, wow that was fast, etc.).

In some implementations, upon receiving the messages including the feedback images, the e-commerce application 124 can parse the feedback images for metadata identifying the user's specific concern and then execute corresponding routines to address the issues. In some instances, that may include relaying the messages to the customer support application 125 (see FIG. 1), which may transmit the message to a corresponding interface presented to a customer support person so they can message with the customer. Advantageously, the interface being viewed by customer support may reflect the same content as the user is viewing in the messaging application, so the customer service representative and the customer are both immediately aware of the history and less times necessary explaining the applicable facts.

In other instances, the e-commerce application 124 may be programmed to automatically retrieve information needed to address the customer's concern and can generate and send automated messages second user, such as that including the tracking information depicted in FIG. 7D.

Figure 1:
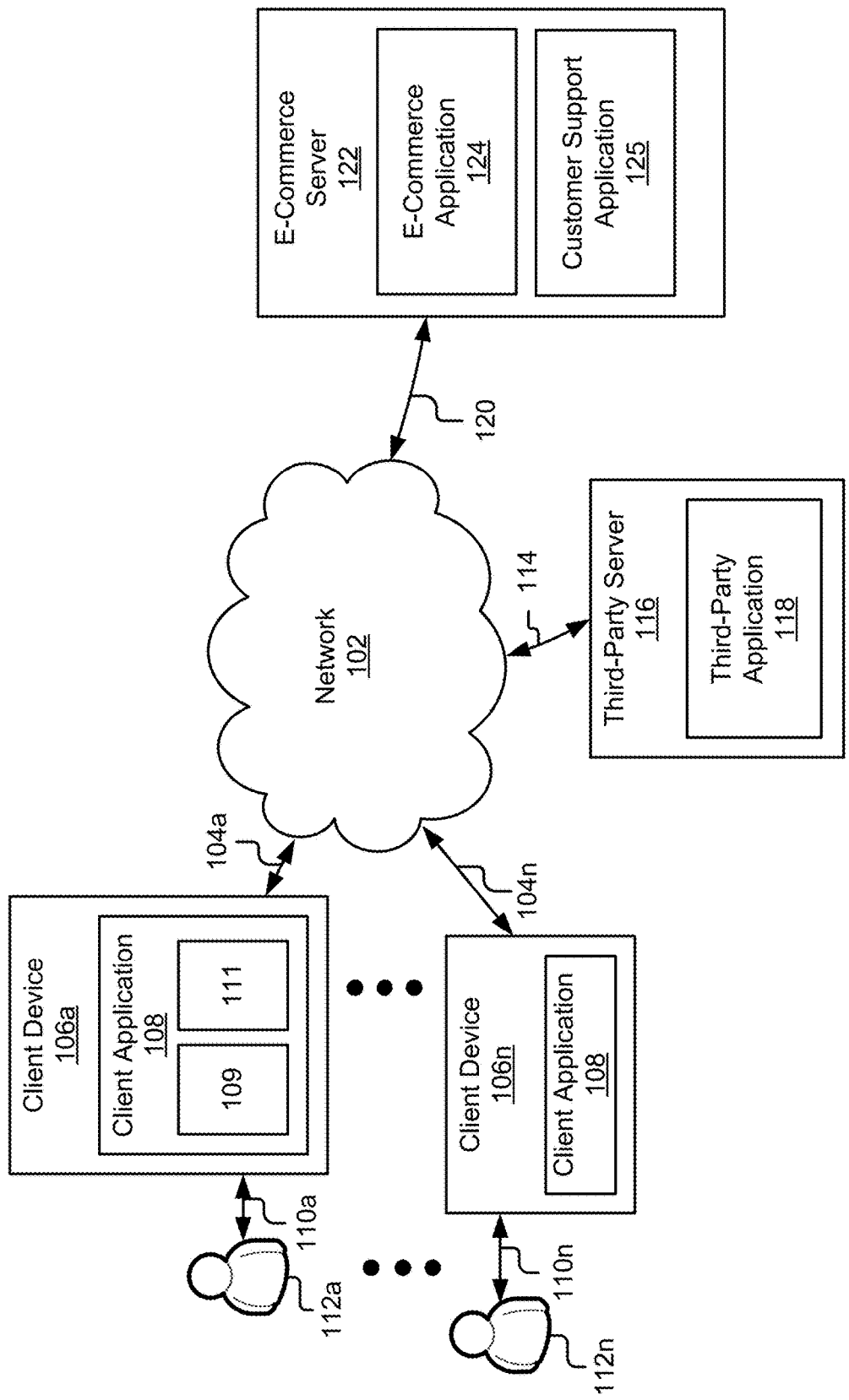
FIG. 1 is a block diagram of an example computer system.
Figure 3:
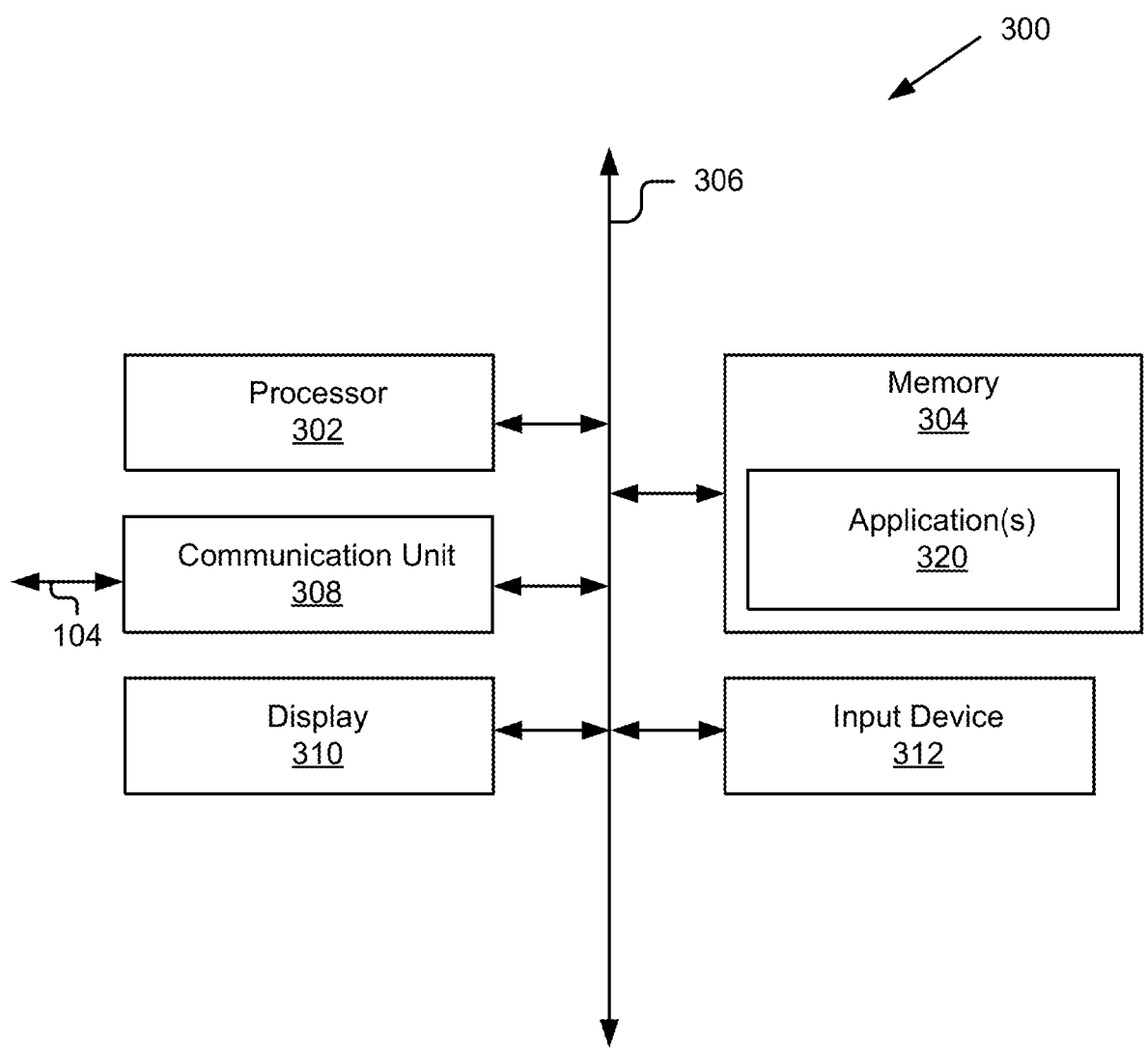
FIG. 3 is a block diagram of an example computing system.

FIG. 1 is a block diagram of an example computer system 100 as described herein and FIG. 3 is a block diagram of an example computing system 300, which may represent the computer architecture of a client device 106, a third-party server 116, and/or an e-commerce server 122, as depicted in FIG. 1, depending on the implementation. For instance, a client device 106 may include one or more of an instance of the messaging application 108a and the e-commerce application 108b; the e-commerce server 122 may include the e-commerce application 124 and the customer support application 125, etc., although other configurations are also possible and contemplated.

The client device 106 includes one or more computing devices having data processing and communication capabilities. The client device 106 may couple to and communicate with other client devices 106 and the other entities of the system 100 via the network 102 using a wireless and/or wired connection, as illustrated by the signal lines 104a, ..., 104n. Examples of client device 106 may include, but are not limited to, mobile phones, tablets, laptops, desktops, netbooks, server appliances, servers, virtual machines, TVs, etc. The system 100 may include any number of client devices 106, including client devices of the same or different type. Users 112a, ..., 112n (also collectively or individually 112) may interact with the client devices 106 using one or more input/output devices (e.g., keyboards, mice, touchscreens, etc.) as illustrated by lines 110a, ..., 110n respectively.

The applications 108, 118, 124, and 125 include software and/or hardware logic that, when executed, programs the processor(s) 304 to perform various operations, acts, and functionality described herein. These elements may be coupled to a data store to store, retrieve, and/or manipulate data stored therein and may be coupled to one another and/or other components of the system 100 to exchange information.

In some implementations, the client application 108 includes computer logic executable by a processor on a client device 106 to provide for user interaction, receive user input, present information to the user via a display, and send data to and receive data from the other entities of the system 100 via the network 102. In some implementations, the client application 108 may generate and present user interfaces based, at least in part, on information received from the e-commerce application 124 and/or the customer support application 125 and/or a web server (not shown) via the network 102. For example, a customer/user 112 may use the client application 108 to select between item categories as described in FIG. 2. In some implementations, the client application 108 includes a messaging application and/or code operable therein, a customized client-side application (e.g., a dedicated mobile app), a combination of both, etc. The client application may be coupled to a data store to store, retrieve, and/or manipulate data stored therein and may be coupled to one another and/or other components of the system 100 to exchange information.

The e-commerce server 122 may include an e-commerce application 124, a web server (not shown), a customer support application 125, and/or components thereof, although other configurations are also possible and contemplated. The e-commerce server 122 may be communicably connected with the network 102 via a wired or wireless connection, as illustrated by signal line 120.

An e-commerce platform, such as the platform powering Staples.com or StaplesAdvantage.com, is embodied at least in part by the e-commerce server 122 and the e-commerce application 124 blocks depicted in FIG. 1, and is coupled to the computer network 102 (e.g., Internet or other suitable virtual/actual private/public networks) for communication with various client devices 106a ... 106n. The client devices 106 are programmed with one or more client applications 108, which are software applications that provide the imaged-based transactional messaging described herein. An example public network may include the Internet or portions thereof.

In some implementations, the e-commerce application 124 includes computer logic executable by processor(s) to provide an e-commerce service or marketplace for various items and may store and provide access to item information (e.g., images, descriptions, categories, specifications, reviews, ratings, retailers, etc.) in a data store. The customer support application may generate relevant information about orders such as order delivery status among other responses to customer concerns about orders. For example, a user may place orders for and/or pay for items, such as office supplies, consumer electronics, other items, etc., ordered on an e-commerce marketplace embodied by the e-commerce application 124 and/or the customer support application 125 using a client device 106.

In some implementations, the server 122 may include a data store, which may be included in the memory 304 or another non-transitory storage device coupled to the bus 306. In some implementations, the data store may be or included in a distributed data store, such as a cloud-based computing and/or data storage system. In some implementations, the data store may include a database management system (DBMS), a file system, or other suitable storage system. For example, the DBMS could be a structured query language (SQL) or a NoSQL DBMS. In some cases, the data store may store data in an object-based data store or multi-dimensional tables comprised of rows and columns, and may manipulate, e.g., insert, query, update, and/or delete, data entries stored in the verification data store 106 using programmatic operations (e.g., queries and statements or a similar database manipulation library). Additional characteristics, structure, acts, and functionality of the data store is discussed elsewhere herein.

In some implementations, the e-commerce server 122 may include a web server (not shown), which includes computer logic executable by processor(s) to processes content requests. The web server may include an HTTP server, a REST (representational state transfer) service, or other suitable server type. The web server may receive content requests (e.g., messaging requests, transactional requests, support requests, etc.) from client devices 106, cooperate with the e-commerce application 124 and/or customer support application 125 to determine the content, retrieve and incorporate data from the data store, format the content, and provide the content to the client devices.

The third-party server 116 may include one or more computing devices having data processing, storing, and communication capabilities. For example, the third-party server 116 may include one or more hardware servers, server arrays, storage devices and/or systems, etc. In some implementations, the third-party server 116 may include one or more virtual servers, which operate in a host server environment and access the physical hardware of the host server including, for example, a processor, memory, storage, network interfaces, etc., via an abstraction layer (e.g., a virtual machine manager). In some implementations, the third-party server 116 may include a web server (not shown) for processing content requests, such as an HTTP server, a REST (representational state transfer) service, or other server type, having structure and/or functionality for satisfying content requests and receiving content from one or more computing devices that are coupled to the network 102 (e.g., the client device 106, etc.) as illustrated by signal line 114.

The third-party server 116 may host services such as a third-party application 118, which may be individual and/or incorporated into the services provided by the e-commerce server 122. In some implementations, the third-party application provides additional acts and/or information such as messaging history, tracking information, interaction data, profile data, shopping data, etc. In further implementations, data provided by the third-party application may alternatively and/or additionally be stored in and retrieved from data sources associated with the e-commerce server 122.

The memory 304 is a non-transitory data storage device that may be comprised of one or more devices and is standard in the industry. The memory 304 may store the application(s) 320 (e.g., 108, 124, 125, 118, etc.) or data produced thereby. The computer processor 302 is a physical or virtual computer processor that may include one or more processors and is standard in industry. The display 310 is a standard display device/screen that can visually, audibly, and/or tactilely present data to users. The communication unit is a hardware or virtual input/output device, such as a wired or wireless computer network interface, physical connection interface, etc. The input device 312 is a device configured to capture user input, whether it is physical, motion, gesture, or sound based. Examples include touchscreens, keyboards, pointing devices, photo or sound sensors, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into to a single computing device or system or additional computing devices or systems, etc. In addition, while the system 100 depicted in FIG. 1 provides an example of an applicable computing architecture, it should be understood that any suitable computing architecture, whether local, distributed, or both, may be utilized in the system 100.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 302.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to embodiment in any specific programming language, or for any specific operating system or environment.

What is claimed is:

1. A method for transacting orders using an asynchronous messaging interface, comprising:
   generating, by a computer processor, a graphical asynchronous messaging user interface including an input region containing a set of digital images of items and an activity region displaying graphical messaging elements respectively representing messages exchanged between a consumer node and a provider node;
   displaying, by a display device coupled to the computer processor, the graphical asynchronous messaging user interface;
   receiving, at an input device coupled to the computer processor, a first user input from a user via the input region selecting a first digital image associated with a first item from the set of digital images of items in the input region;
   generating, by the computer processor, a first message including the first digital image associated with the first item;
   including, by the computer processor, the first message including the first digital image associated with the first item in a first messaging element in the activity region displayed to the user on the display device;
   transmitting, by a communication unit coupled to the computer processor and associated with the consumer node, the first message via a public computer network as a purchase request for the first item to the provider node;
   responsive to transmitting the first message, receiving a second message including a confirmation of receipt of an order to purchase the first item from the provider node;
   including, by the computer processor, the second message including the confirmation of receipt of the order in a second messaging element in the activity region displayed to the user on the display device;
   generating, by the computer processor, a second digital image including a sentiment about the purchase of the first item; and
   updating, by the computer processor, the set of digital images of items in the input region with the second digital image.

2. The method of claim 1, wherein the graphical asynchronous messaging user interface includes user selectable content regions for categories of digital images, the set of digital images of items is associated with a first category from among the categories, the first category is associated with a first content region, and other sets of digital images of items respectively are divided among categories associated with other of the user selectable content regions.

3. The method of claim 1, wherein the input region includes a customized keyboard including an image region including the set of digital images of items.

4. The method of claim 1, further comprising:
   completing an order transaction for the first item associated with the first digital image; and
   populating a support category included in the input region with the second digital image.

5. The method of claim 1, wherein the set of digital images of items reflect items that are purchasable via an electronic commerce platform, and the provider node includes a server for receiving and responding to order transaction requests from the consumer node.

6. The method of claim 1, wherein the first digital image associated with the first item includes metadata identifying one or more of an item identifier, item price, date and time.

7. The method of claim 1, wherein the second message includes an electronic link selectable by the user via the input device to display an interface for completing payment for the first item.

8. The method of claim 1, further comprising:
completing a purchase transaction for the first item responsive to transmitting the first message;
receiving, at the input device coupled to the computer processor, a second user input selecting the second digital image from the set of digital images of items;
generating, by the computer processor, a third message including the second digital image; and
including, by the computer processor, the third message including the second digital image in a third messaging element in the activity region displayed to the user on the display device, at least the first messaging element, the second messaging element, and the third messaging element comprising a messaging thread reflecting a transactional history associated with the first item; and
transmitting, by the communication unit coupled to the computer processor and associated with the consumer node, the third message including the second digital image via the public computer network as a second request to the provider node.

9. The method of claim 8, further comprising:
responsive to transmitting the second request, receiving, by the computer processor, one or more of a support call from a customer service node and a response message addressing the sentiment depicted by the second third message.

10. An order communication method comprising:
loading, by a computer processor, a keyboard software object that renders a keyboard interface including an image region and a category region, the category region including a plurality of user-selectable tabs corresponding to a plurality of different categories, the plurality of user-selectable tabs being visually distinguishable;
determining, by the computer processor, a first category as an active category from the plurality of different categories, the active category being associated with a first tab;
displaying, by the computer processor, a first set of digital images of items in the image region that correspond to the active category, the digital images of the first set being user-selectable via the keyboard interface to message in association with a first order transaction;
receiving, by an input device coupled to the computer processor, a first user input via the image region selecting a first digital image associated with a first item from the first set of digital images of items in the image region;
populating, by the computer processor, an activity region of a messaging application with a first message including the selected first digital image associated with the first item;
transmitting, by a communication unit coupled to the computer processor and associated with a consumer node, a first order for the first item via a public computer network to a provider node based on the first message including the selected first digital image associated with the first item;
receiving, by the communication unit coupled to the computer processor, a first response via the public computer network confirming receipt of the first order for the first item from the provider node;
populating, by the computer processor, the activity region of the messaging application with a second message confirming the receipt of the first order for the first item;
generating, by the computer processor, a second digital image including a sentiment about the first order for the first item; and
updating, by the computer processor, a second set of digital images in the image region that correspond to a second category with the second digital image.

11. The order communication method of claim 10, further comprising:
receiving, at the input device, a second user input via the category region selecting a second tab corresponding to the second category different from the active category;
determining the second category to be the active category; and
displaying the second set of digital images of items in the image region that correspond to the second category.

12. The order communication method of claim 11, further comprising:
receiving, at the input device, a third user input via the image region selecting a third digital image associated with a second item from the second set of digital images of items in the image region;
populating, by the computer processor, the activity region of the messaging application with a third message including the selected third digital image associated with the second item;
transmitting, by the communication unit, a second order for the second item via the public computer network to the provider node;
receiving, by the communication unit, a second response from the provider node via the public computer network confirming the receipt of the second order for the second item; and
populating, by the computer processor, the activity region of the messaging application with a fourth message confirming the receipt of the second order for the second item, the activity region of the messaging application displaying a messaging thread including the first message, the second message, the third message, and the fourth message, the messaging thread reflecting a transactional history of the first order and the second order.

13. The order communication method of claim 10, wherein the image region is scrollable.

14. The order communication method of claim 10, wherein the first tab is highlighted when the first category is the active category.

15. A computer system, comprising:
an input device;
a computer processor coupled to the input device via a communication bus;
a display device coupled to the computer processor via the communication bus;
a communication unit coupled to the computer processor via the communication bus;
a computer memory coupled to the computer processor via the communication bus, the computer memory storing instructions that, when executed by the computer processor, cause the computer system to perform operations comprising:
generating a graphical asynchronous messaging user interface including an input region containing a set of digital images of items and an activity region displaying graphical messaging elements respectively representing messages exchanged between a consumer node and a provider node;
displaying the graphical asynchronous messaging user interface at the display device;

receiving a user input at the input device via the input region from a user, the user input selecting a first digital image associated with a first item from the set of digital images of items in the input region;

generating a first message including the first digital image associated with the first item;

including the first message including the first digital image associated with the first item in a first messaging element in the activity region displayed to the user on the display device;

transmitting the first message via the communication unit via a public computer network as a purchase request for the first item to the provider node;

responsive to transmitting the first message, receiving a second message including a confirmation of receipt of an order to purchase the first item from the provider node;

including the second message including the confirmation of receipt of the order in a second messaging element in the activity region displayed to the user on the display device;

generating a second digital image including a sentiment about the purchase of the first item; and updating the set of digital images of items in the input region with the second digital image.

16. The computer system of claim 15, wherein the graphical asynchronous messaging user interface includes user selectable content regions for categories of digital images, the set of digital images of items is associated with a first category from among the categories, the first category is associated with a first content region, and other sets of digital images of items respectively are divided among categories associated with other of the user selectable content regions.

17. The computer system of claim 15, wherein the input region includes a customized keyboard including an image region including the set of digital images of items.

18. The computer system of claim 15, wherein the instructions, when executed by the computer processor, further cause the computer system to perform operations comprising:

completing an order transaction for the first item associated with the first digital image; and populating a support category included in the input region with the second digital image.

19. The computer system of claim 15, wherein the set of digital images of items reflect items that are purchasable via an electronic commerce platform, and the provider node includes a server for receiving and responding to order transaction requests from the consumer node.

20. The computer system of claim 15, wherein the first digital image associated with the first item includes metadata identifying one or more of an item identifier, item price, date and time.

* * * * *